May 5, 1925.
E. JACOBUS
1,536,861
THERMOSTATIC VENT VALVE FOR RADIATORS
Filed Sept. 24, 1924
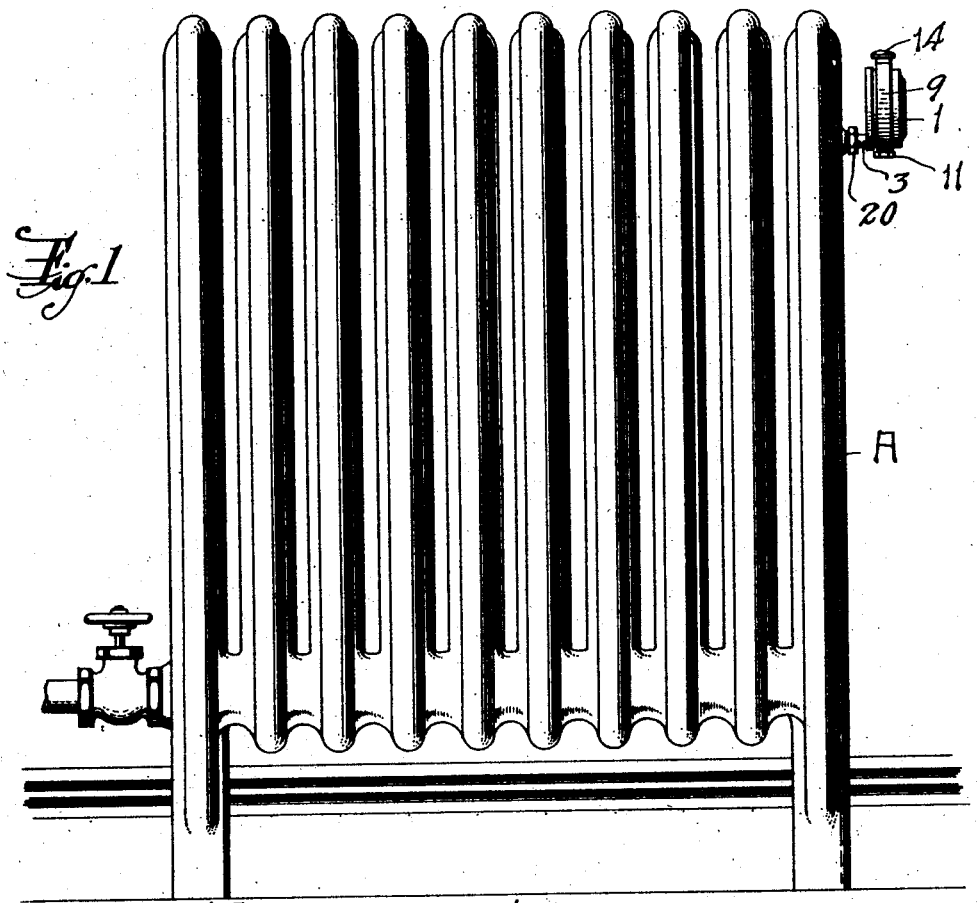
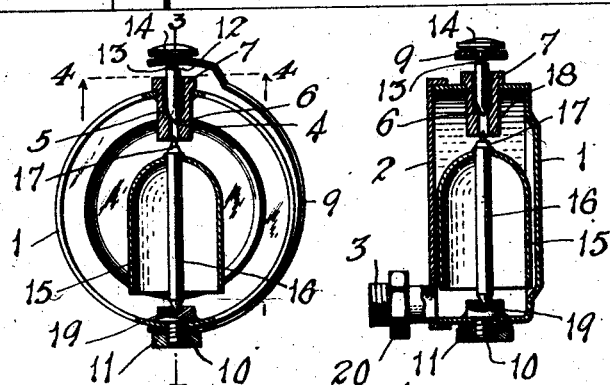
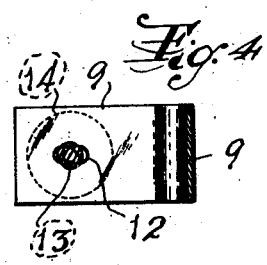
INVENTOR.
Edward Jacobus
BY
Everett Cook
ATTORNEYS.

Patented May 5, 1925.

1,536,861

UNITED STATES PATENT OFFICE.

EDWARD JACOBUS, OF MONTCLAIR, NEW JERSEY.

THERMOSTATIC VENT VALVE FOR RADIATORS.

Application filed September 24, 1924. Serial No. 739,446.

*To all whom it may concern:*

Be it known that I, EDWARD JACOBUS, a citizen of the United States, and a resident of Montclair, in the county of Essex and State of New Jersey, have invented new and useful Improvements in Thermostatic Vent Valves for Radiators, of which the following is a specification.

This invention relates in general to thermostatic valves to control the flow of a fluid or fluids therethrough in accordance with the temperature of the fluids, and more particularly the invention relates to a valve having thermostatically controlled means for allowing opening of the valve to permit fluids of a certain range of temperatures to pass therethrough and closing the valve to prevent fluids of temperatures above said range from escaping through the valve.

One object of the invention is to provide a valve of the character described embodying novel and improved features of construction whereby the valve shall be thoroughly dependable under all working conditions and shall not be subject to corrosion or sticking of the vent valve, etc.

Further objects are to provide such a valve embodying improved features of construction whereby the vent valve is positively closed by a thermostatic element against the flow of hot air or steam and adapted to be opened by cold air under pressure without resistance by said thermostatic element, so that the valve is both opened and closed quickly without probability of sticking; to provide a valve of this character in which the valve is closed independently of the thermostatic element upon a decrease in pressure in a radiator or pipe below atmospheric pressure so that air may be prevented from entering a steam heating system as pressure falls therein; to provide a thermostatic vent valve having the thermostatic element mounted exteriorly of and closely conforming to the casing to prevent corrosion of the thermostat and valve and to enable the valve to close against and open with pressure within the casing; to provide such a valve including a float valve within the casing independent of said thermostatically operated valve to prevent water from passing through the pipe or casing, and to obtain other results and advantages as may be brought out by the following description.

Referring to the accompanying drawings, in which the same reference characters designate corresponding and like parts throughout the several views, Figure 1 is a side elevation of a radiator vent valve embodying my invention, showing the same applied to a radiator;

Figure 2 is an enlarged end elevation of the valve with one end wall removed, showing the mounting of the thermostatic strip, the valve seat nipple being shown in section;

Figure 3 is an enlarged transverse vertical sectional view through the valve taken on the line 3—3 of Figure 2, and Figure 4 is a horizontal sectional view taken on the line 4—4 of Figure 2.

In the specific embodiment of the invention shown on the drawings, the reference character 1 designates a substantially hollow cylindrical casing closed at both ends, said casing being conveniently formed of sheet metal by a drawing operation and having one end in the form of a cover 2 to which is secured a threaded nipple 3 for connecting the valve to a radiator A of a steam heating system. The casing 1 is provided at one side thereof with an outlet passage 4 which may be formed in a nipple 5 secured to the casing in any suitable manner as by soldering. Intermediate its ends, the passage 4 is formed with an outwardly facing valve seat 6 with which cooperates a valve head 7 carried by one end of a substantially semi-circular thermostatic strip 9, the other end of which is fixedly secured to the casing 1 exteriorly thereof and diametrically opposite the passage 4 by suitable means such as the bolt and nut 10 and 11, respectively. The free end of the thermostatic strip 9 is provided with an elongated slot 12 in which is loosely mounted a reduced shank 13 on the valve head 7. The shank 13 extends through the slot 12 and carries at its outer end a fixed head 14. With this construction, the valve head 7 is so connected to the thermostatic strip 9 as to permit slight relative movement of the valve head and the strip in all directions.

The thermostatic strip 9 may be of any suitable construction, but preferably is of laminated construction comprising two metals having different co-efficients of expansion and so arranged that upon heating, the ends of the strip will tend to approach each other. In the operation of the device, when the radiator A is filled with air and steam is admitted thereto, the thermostatic strip 9 is distended so as to maintain the valve head 7 out of engagement with the seat 6 and permit the escape of air. When steam enters the valve casing, the thermostatic strip is expanded so as to cause the free end thereof to move toward and transversely of the valve seat 6. This action exerts a longitudinal thrust on the valve head 7 which causes the valve head to engage the seat 6 and prevent escape of steam through the passage 4.

With this construction, it will be observed that the slot 12 in the strip 9 and the reduced shank 13 of the valve head 7 permit substantial movement of the free end of the strip transversely of the valve seat 6 in any direction without in any way affecting the proper engagement of the valve head with the valve seat. It will be further noted that the valve head 7 and thermostatic strip are located wholly exteriorly of the casing 1 so as to be in no way affected by corrosion or the like. Also, the valve head 7 is opened in the direction of the flow of air out of the casing, so that should the valve head become accidentally stuck on the seat 6 the pressure of the air would tend to unseat the valve. This particular arrangement of the valve head, thermostatic strip and seat 6 also ensures that all of the air will be expelled from the radiator before the valve closes, since the valve must be closed against the outgoing pressure and the temperature in the casing must thus be sufficient to expand the thermostatic strip to an extent capable of overcoming this pressure. Further, the valve head 7 will be drawn to its seat 6 as the pressure in the radiator falls below atmospheric pressure, so that excessive air will be prevented from entering the heating system. The semi-circular shape of the thermostatic strip 9 has been found in practice to operate the vent valve much more quickly than thermostatic elements of other shapes, that is, the semi-circular shape of thermostats such as herein described will serve to close the valve with only two ounces of steam in the heating system, while other types of thermostats require from one to five pounds of steam to properly operate the vent valves. Also, the semi-circular shape of the thermostatic strip permits it to closely conform to the casing, as clearly shown in Figure 2, so as to be practically immune from injury by blows or the like, and such distortion as may accidentally occur will be compensated by the loose connection of the valve head with the strip.

It is particularly desirable to provide means for preventing the escape of water from a heating system, and for this purpose I may utilize a float 15 fixedly secured to a rod 16 one end of which carries a valve head 17 adapted to cooperate with a seat 18 on the inner end of the passage 4. The other end of the rod 16 may be supported in a recess 19 formed in the head of the bolt 10. With this construction, any rise of water in the casing 1 will raise the float 15 and cause engagement of the valve head 17 with the seat 18 so as to prevent any flow of water out of the casing. A jam nut 20 is preferably threaded on the nipple 3 and adapted to be clamped against the radiator when the valve is in position to restrain and make more difficult the unauthorized removal of the valve from a radiator.

It will be understood that the particular details of construction herein illustrated are more particularly for the purpose of explaining the principles of the invention, and these details may be modified or changed by those skilled in the art without departing from the spirit or scope of the invention. Therefore, I do not desire to be understood as limiting myself except as required by the following claims when constructed in the light of the prior art.

Having thus described the invention, what I claim is:

1. A valve of the character described, comprising a casing having an inlet and an outlet, said outlet having an outwardly facing valve seat, a substantially semi-circular thermostatic strip having one end fixedly connected to said casing exteriorly thereof at a distance from said outlet and the other end in opposed spaced relation to said valve seat and movable toward and from said valve seat upon influx of hot and cold fluid respectively into said casing, and a valve head carried by the second-mentioned end of said thermostatic strip and actuated by said strip into and out of engagement with said seat to close and open said outlet.

2. A valve of the character described, comprising a substantially cylindrical casing having an inlet and an outlet, said outlet being substantially radial and having an outwardly facing valve seat therein, a substantially semi-circular thermostatic strip having one end secured to said casing exteriorly thereof and diametrically opposite said outlet, the other end of said strip being movable toward and from said valve seat upon influx of hot and cold fluid respectively into said casing, and a valve head arranged between the second-mentioned end of said thermostatic strip and said valve seat and controlled by said thermostatic strip to close and open said outlet upon influx of hot and cold fluid respectively into said casing.

3. A valve of the character described, comprising a substantially cylindrical casing having an inlet and an outlet, said outlet being substantially radial and having an outwardly facing valve seat therein, a substantially semi-circular thermostatic strip having one end secured to said casing exteriorly thereof and diametrically opposite said outlet, the other end of said strip being movable toward and from said valve seat upon influx of hot and cold fluid respectively into said casing, and a valve head mounted on the second-mentioned end of said thermostatic strip and actuated by said strip into and out of engagement with said valve seat to close and open said outlet.

4. A valve of the character described, comprising a substantially cylindrical casing having an inlet and an outlet, said outlet being substantially radial and having an outwardly facing valve seat and an inwardly facing valve seat, a substantially semi-circular thermostatic strip, a bolt for securing one end of said strip to said casing exteriorly thereof and diametrically opposite said outlet, said bolt having a recess in the inner end thereof, the other end of said strip carrying a valve head and being movable into and out of engagement with said outwardly opening valve seat upon influx of hot and cold fluid respectively to close and open said outlet respectively, and a float valve within said casing having one end loosely slidable in said outlet and the other end slidable in said recess in said bolt, said valve cooperating with said inwardly facing valve seat to close said outlet upon influx of liquid into said casing.

5. A valve of the character described, comprising a casing having an inlet and an outlet, said outlet having an outwardly facing valve seat, a thermostatic element mounted exteriorly on said casing to move toward and from said valve seat upon influx of hot and cold fluid respectively into said casing, and a valve head to cooperate with said valve seat to normally close said outlet and freely movable away therefrom independently of said thermostatic element upon influx of cold fluid under pressure into said casing, said valve head being forcibly actuated into engagement with said valve seat by said thermostatic element upon influx of hot fluid into said casing.

6. A valve of the character described, comprising a casing having an inlet and an outlet, said outlet having an outwardly facing valve seat, a thermostatic element mounted exteriorly on said casing to move toward and from said valve seat upon influx of hot and cold fluid respectively into said casing, and a valve head loosely connected to said thermostatic element to normally close said outlet independently of said thermostatic element upon decrease in pressure in said casing below atmospheric and freely movable independently of said thermostatic element away from said valve seat upon influx of cold fluid under pressure into said casing, said valve head being forcibly actuated into engagement with said valve seat by said thermostatic element upon influx of hot fluid into said casing.

EDWARD JACOBUS.